United States Patent
Kohl et al.

(10) Patent No.: US 11,218,093 B2
(45) Date of Patent: Jan. 4, 2022

(54) METHOD FOR DRIVING, DRIVE CIRCUIT, BRAKE SYSTEM AND USE

(71) Applicant: Continental Teves AG & Co. OHG, Frankfurt am Main (DE)

(72) Inventors: Andreas Kohl, Mainz (DE); Bogdan Budianu, Oberursel (DE); Andreas Strecker, Frankfurt (DE); Alexandru Turcanu, Miroslava (RO)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/928,795

(22) Filed: Jul. 14, 2020

(65) Prior Publication Data

US 2020/0343835 A1 Oct. 29, 2020

Related U.S. Application Data

(63) Continuation of application No. PCT/EP2019/050569, filed on Jan. 10, 2019.

(30) Foreign Application Priority Data

Jan. 15, 2018 (DE) .................... 10 2018 200 599.0
Jan. 9, 2019 (DE) .................... 10 2019 200 181.5

(51) Int. Cl.
*H02P 3/22* (2006.01)

(52) U.S. Cl.
CPC ............ *H02P 3/22* (2013.01); *H02P 2201/03* (2013.01)

(58) Field of Classification Search
CPC .............................. H02P 3/22; H02P 2201/03
USPC ........................................................ 318/379
See application file for complete search history.

(56) References Cited

U.S. PATENT DOCUMENTS

| | | | | |
|---|---|---|---|---|
| 2014/0300298 A1* | 10/2014 | Liu | ......................... | H02M 5/453 |
| | | | | 318/380 |
| 2015/0214858 A1* | 7/2015 | Raichle | ................. | H02M 7/537 |
| | | | | 363/131 |
| 2019/0173395 A1* | 6/2019 | Huettinger | .............. | H02M 1/32 |

FOREIGN PATENT DOCUMENTS

| | | | | |
|---|---|---|---|---|
| DE | 10159639 | A1 | 6/2003 | |
| DE | 102012216008 | A1 | 3/2014 | |
| EP | 2433830 | A1 * | 3/2012 | ................ B60L 3/04 |
| EP | 2433830 | A1 | 3/2012 | |

OTHER PUBLICATIONS

International Search Report and Written Opinion dated Apr. 16, 2019 from corresponding International Patent Application No. PCT/EP2019/050569.

* cited by examiner

*Primary Examiner* — Jorge L Carrasquillo

(57) ABSTRACT

A method for driving a multiphase motor by a drive circuit, wherein the drive circuit comprises a plurality of transistors, and for each phase of the motor are provided a first path and a second path, wherein at least one transistor is assigned to the first path and to the second path of each of the different phases, and wherein a normal mode, a first drive mode, and a third drive mode are provided, wherein for the first drive mode, all the transistors in the second paths are short-circuited, and for the third drive mode, all the transistors are opened. The method includes detecting an undervoltage or an overvoltage in the drive circuit, operating the drive circuit in the first drive mode if a first undervoltage has been detected, and operating the drive circuit in the second drive mode if a second undervoltage has been detected.

17 Claims, 1 Drawing Sheet

METHOD FOR DRIVING, DRIVE CIRCUIT, BRAKE SYSTEM AND USE

CROSS REFERENCE TO RELATED APPLICATIONS

This application claims priority to PCT Application No. PCT/EP2019/050569, filed on Jan. 10, 2019, which claims priority to German patent applications DE 10 2018 200 599.0, filed Jan. 15, 2018 and DE 10 2019 200 181.5, filed Jan. 9, 2019, wherein the contents of such applications are incorporated herein by reference.

TECHNICAL FIELD

A method for driving, a drive circuit, a brake system and related methods.

TECHNICAL BACKGROUND

Brake systems that can be operated in by-wire operation are known in the prior art. In these cases, the pressure is built up by a linear actuator (motor).

Field effect transistors (FETs) in the high-side path and low-side path are used for driving the motor, and known modes include the following three different modes:
1) opening all the FETs;
2) short-circuiting all the low-side FETs; and
3) alternating between opening and short-circuiting all the FETs.

If the combustion engine is started during pressure build-up, an extreme undervoltage can arise, which, below 6.2V, leads to the BLDC motor drive being switched off immediately. It is necessary to switch off the motor immediately in order to prevent damage to an output stage and avoid fault detections from a gate drive unit (hardware module in front of the power output stage for the motor that prevents and monitors fundamental electrical faults), which would otherwise cause a permanent shutdown of the system. This is desirable for mechanical reasons, because a linear actuator under pressure is pushed backwards by the prevailing hydraulic pressure into the mechanical end stop, with the result that the mechanical friction coupling might be damaged there.

As regards the motor drive circuit, this means that if the motor is being driven in a normal operating mode and there is hydraulic pressure in the system, the current consumption is such that the DC-link capacitance in the drive circuit is rapidly discharged.

The disadvantage in the prior art is, in summary:
the linear actuator may be pushed back by the hydraulic pressure, causing a severe loss of pressure;
damage to the friction coupling may occur as a result of the motor speed being too high on reaching the end stop;
too low a DC-link voltage may arise, which results in losing control over the GDU and the motor.

What is needed is an improved method for driving and an associated improved drive circuit.

DETAILED DESCRIPTION OF THE EMBODIMENTS

Figure 1:
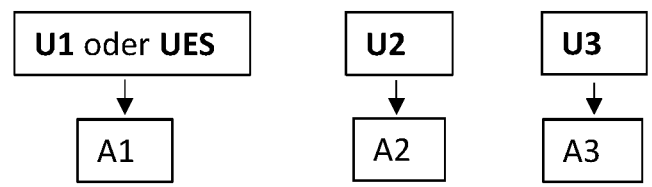
FIG. 1 illustrates a schematic view showing an overview of the assignment of undervoltages and overvoltage to the respective drive modes in accordance with one or more embodiments.

FIG. 1 shows the assignment of undervoltages and overvoltage to the respective drive modes. The first undervoltage is labelled U1, the second undervoltage is labelled U2, and the third undervoltage is labelled U3. The overvoltage has the reference sign UES. The first drive mode A1 is activated if a first undervoltage U1 or an overvoltage UES is detected. The second drive mode A2 is activated if a second undervoltage U2 is detected. The third drive mode A3 is activated on detecting a third undervoltage U3. The second undervoltage U2 is identified when the DC-link voltage drops to a value below a second threshold value. The first undervoltage U1 is identified when the DC-link voltage S falls into the range between a first threshold value and the second threshold value. An overvoltage UES is identified when the DC-link voltage attains a value above a third threshold value. The third undervoltage U3 constitutes a special case in which there is a fault caused by an internal undervoltage.

A plurality of transistors is provided in the associated drive circuit for the multiphase motor, with a first path and a second path provided for each phase of the motor. At least one transistor is assigned to the first path and in the second path of each of the different phases. The motor is optionally in the form of a three-phase motor. The first path of the drive circuit is embodied as the high-side path, and the second path is embodied as the low-side path, wherein both the high-side path and the low-side path comprise a transistor for each phase of the motor. Thus, both the high-side path and the low-side path each optionally comprise three transistors. The transistors are optionally in the form of field effect transistors (FETs).

In the first drive mode A1, all three transistors in the low-side path are short-circuited (SHORT mode). The pressure in the system is thereby maintained and the DC-link voltage slowly drops further.

In the third drive mode A3, all the transistors (both in the high-side path and in the low-side path) are opened (OPEN mode).

In the second drive mode A2, operation alternates between the first drive mode A1 and the third drive mode A3 (TOGGLE mode).

Figure 2:
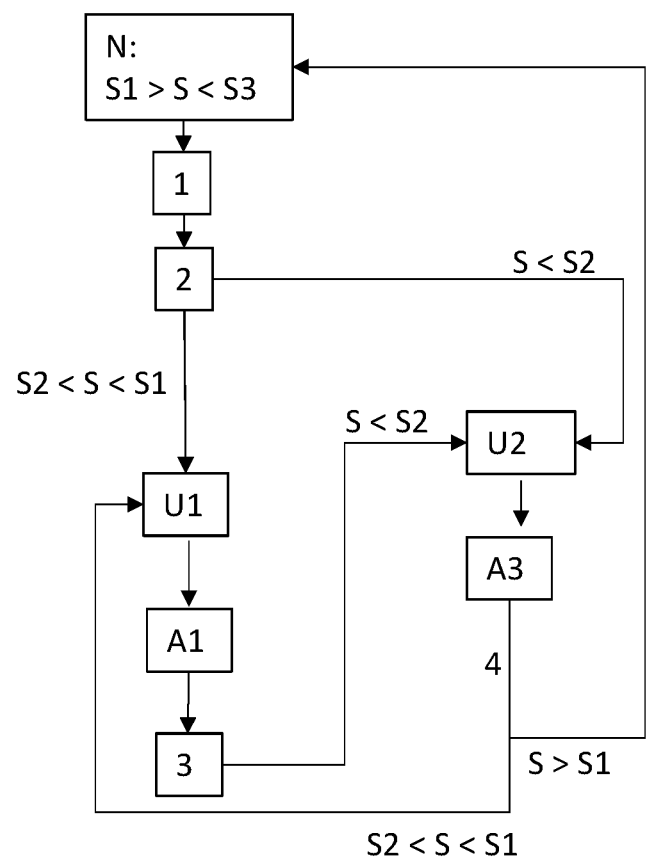
FIG. 2 illustrates a flow diagram for cases in which a first or second undervoltage exists, in accordance with one or more embodiments.

FIG. 2 shows a flow diagram for the cases in which a first undervoltage U1 or a second undervoltage U2 exists.

In normal mode N, the DC-link voltage S of the drive-circuit capacitance lies between the first threshold value S1 and the third threshold value S3. If a high pressure then appears in the system (reference number 1), this leads to a high current consumption, with the result that the capacitance in the drive circuit is discharged relatively quickly (reference number 2). The DC-link voltage S hence drops.

The subsequent steps are classified under two different cases, namely a drop in the DC-link voltage S to below the first threshold value S1 or a drop in the DC-link voltage S to below the second threshold value S2. The second threshold value S2 is defined to be lower than the first threshold value S1. For example, the first threshold value lies at 6.2V and the second threshold value lies at 5.8V. The third threshold value may be defined at 38V, for instance.

In the first case, the DC-link voltage then lies between the first threshold value S1 and the second threshold value S2, so optionally between 5.8V and 6.2V. Thus, the undervoltage U1 has occurred here. Once the undervoltage U1 has been detected, a suitable error message is optionally generated. At all events, however, the first drive mode A1 (SHORT mode) is activated, in which the transistors of the low-side path are short-circuited. This results in the intrinsic current consumption of the gate driver unit now being the only load on the drive circuit capacitance. The DC-link voltage S hence drops further very slowly (reference number 3).

If the DC-link voltage S has dropped so far that it goes below the second threshold value S2, the second undervoltage U2 is ascertained and a suitable error message is optionally generated. At all events, the mode is then switched into the third drive mode A3 (TOGGLE mode). For this mode, toggling between the first drive mode A1 and the second drive mode A2 takes place. This causes energy to be fed back into the capacitance, and the DC-link voltage S rises (reference number 4). The third drive mode A3 is maintained until the DC-link voltage S lies above the second threshold value S2 or even above the first threshold value S1.

In the event that the DC-link voltage S lies above the second threshold value S2 and below the first threshold value S1, an undervoltage U1 is detected once again, and the corresponding method steps are performed. In the event that the DC-link voltage S lies above the first threshold value S1 and below the third threshold value, normal mode N is activated.

From within normal mode N it is possible for the DC-link voltage S to drop also directly to a value below the threshold value S2. An undervoltage U2 is then ascertained directly and the procedure follows the method steps already described.

In practice, the DC-link voltage S is measured and then compared with the threshold values S1, S2, S3 in order to be able to recognize an undervoltage U1, U2, U3 or an overvoltage UES.

The statements below provide further information on the invention:

Unlike previous methods, in the event of the undervoltage switch-off, the motor is not simply switched into a high-resistance state or short-circuited, but is shifted into a generator mode, so that the pushing-back of the linear actuator by the prevailing hydraulic pressure generates a sufficient generator voltage at the motor. This ensures an adequate supply to the GDU, so that the bridge composed of the transistors (B6 bridge) cannot be damaged. This is achieved by the bridge short-circuiting the motor at all the poles, thereby allowing a current to flow in the windings as a result of the motor rotation. This current brakes the motor. In the next step, the bridge is switched off. This results in a high DC-link voltage, which via the intrinsic diodes of the FETs leads to feedback into the DC-link capacitor, from which the GDU is also supplied. The "short-circuit" and "open" steps are repeated until the DC-link voltage rises again above 6.2V.

As soon as the DC-link voltage has exceeded the existing undervoltage threshold, control is returned to the field controller in order to facilitate as quickly as possible an efficient motor drive and the pressure regulation. If the field controller consumes too much current, the DC-link voltage may again drop below the undervoltage threshold, and the process repeats itself.

The motor unit is thus intermittently switched off and on again rapidly, but its behaviour results in reliable brake operation, and therefore the motor no longer travels at high speed into the end stop. This prevents damage to the friction coupling and to the electrical components of the motor.

The embodiments relate to a method for driving a multiphase motor by a drive circuit. The drive circuit comprises a plurality of transistors, and for each phase of the motor are provided a first path and a second path, wherein at least one transistor is assigned to the first path and to the second path of each of the different phases. A normal mode, a first drive mode and a third drive mode are provided for driving the motor, wherein for the first drive mode, all the transistors in the second paths are short-circuited, and for the third drive mode, all the transistors are opened. In addition, according to one or more embodiments, a second drive mode is provided, in which operation alternates between the first drive mode and the third drive mode. The following steps are performed:

ascertaining an undervoltage or an overvoltage in the drive circuit;

operating the drive circuit in the first drive mode if a first undervoltage has been detected; and operating the drive circuit in the second drive mode if a second undervoltage has been detected.

In one or more embodiments, the different modes (first drive mode and second drive mode) are employed when different voltage values are reached. It is thereby possible to prevent an undesirable pushing-back of the linear actuator and at the same time to protect the electrical components of the motor from destruction. In addition, the DC-link voltage is increased, making it possible for the gate driver unit to drive the FETs correctly. This hence prevents damage to the friction coupling and to the electrical components of the motor. The transistors are optionally in the form of field effect transistors (FETs).

In one or more embodiments, the drive circuit is operated in the third drive mode if a third undervoltage has been detected. This third undervoltage optionally involves an internal electrical fault situation in which only an internal undervoltage, not an external undervoltage, occurs. In this fault situation, all braking functions are switched off and recourse is made to the hydraulic fallback level.

In one or more embodiments, the drive circuit is operated in the first drive mode if an overvoltage has been detected. In this case, the excess energy is optionally eliminated via the ohmic resistance of the motor coils. It is hence advantageously possible to dissipate this energy without the need for a Zener diode. In the first drive mode, the pressure in the system is substantially maintained.

In one or more embodiments, at least one first and/or one second threshold value is provided for detecting the first or the second undervoltage. The first undervoltage is ascertained in this case if a DC-link voltage is detected between the first threshold value and the second threshold value.

In one or more embodiments, the second undervoltage is ascertained if a DC-link voltage is detected below the second threshold value. Particularly optionally, the second threshold value is defined to be lower than the first threshold value.

For example, the first threshold value is set to a voltage of 6.2V, and the second threshold value to a voltage of 5.8V. These are only example values, however; the threshold values can be defined to be anything else. If the DC-link voltage across a certain capacitance of the drive circuit (at the terminal referred to as KL30 M) drops to below the first threshold value, then the first undervoltage is detected and the first drive mode is activated. All the transistors in the second paths are short-circuited for this mode. The DC-link voltage hence continues to drop, but only very slowly. If the DC-link voltage enters a range below the second threshold value, then a second undervoltage is detected and the mode is switched into the second mode. This mode involves alternating between all the FETs being opened and all the FETs in the second paths being short-circuited (TOGGLE mode). This results in energy being fed back, causing the DC-link voltage in the capacitance to rise.

In one or more embodiments, the drive circuit is operated in normal mode as soon as a DC-link voltage in the capacitance is detected above the first threshold value and below a third threshold value. Normal mode is optionally the mode in which no special adjustments are made, and the mode in which the system is running without faults. The third threshold value optionally defines the limit for the overvoltage.

Operating in TOGGLE mode, or the second drive mode, can result in the DC-link voltage rising so far during the feedback of energy that it lies above the first threshold value. In this case, it is possible to proceed in normal mode (normal operating mode).

In all the drive modes described (apart from the normal operating mode), the EES (electric energy supply) additionally takes on motor control.

The invention also relates to a drive circuit for driving the multiphase motor, wherein the drive circuit is suitable for performing the described method. The invention also relates to a brake system comprising this drive circuit, and to using this drive circuit in a brake system. The brake system is located particularly optionally in a motor vehicle.

The invention claimed is:

1. A method for driving a multiphase motor by a drive circuit, the method comprising:
   detecting that a DC-link voltage of the drive circuit is less than a first voltage and greater than a second voltage, wherein the second voltage is less than the first voltage;
   operating the drive circuit in a first drive mode in response to detecting the DC-link voltage of the drive circuit is less than the first voltage and greater than the second voltage, wherein the first drive mode comprises a drive mode in which all transistors of a first path of the multiphase motor are short-circuited;
   operating the drive circuit in a second drive mode in response to detecting that the DC-link voltage of the drive circuit is less than the second voltage, wherein the second drive mode comprises a drive mode in which all transistors of the first path and all transistors of a second path of the multiphase motor are opened;
   detecting that the DC-link voltage of the drive circuit rises above the second voltage and less than the first voltage; and
   alternating operating the drive circuit between the first drive mode and the second drive mode until the DC-link voltage of the drive circuit rises above the first voltage.

2. The method as claimed in claim 1, further comprising:
   detecting that the DC-link voltage of the drive circuit is greater than a third voltage, wherein the third voltage is an overvoltage greater than the first voltage; and
   operating the drive circuit in the first drive mode in response to detecting that the DC-link voltage of the drive circuit is greater than the third voltage.

3. The method as claimed in claim 2, further comprising:
   detecting that the DC-link voltage of the drive circuit is less than the third voltage and greater than the first voltage; and
   operating the drive circuit in a normal mode in response to detecting that the DC-link voltage of the drive circuit is less than the third voltage and greater than the first voltage.

4. The method as claimed in claim 3, wherein the first voltage is 6.2v, the second voltage is 5.8v, and the third voltage is 38v.

5. The method as claimed in claim 1, wherein the first path of the multiphase motor is a low-side path.

6. The method as claimed in claim 5, wherein the second path of the multiphase motor is a high-side path.

7. The method as claimed in claim 6, wherein the transistors of the first path and the transistors of the second path comprise field effect transistors (FETs).

8. The method as claimed in claim 7, wherein the transistors of the first path comprise three FETs and the transistors of the second path comprise three FETs.

9. A drive circuit for driving a multiphase motor, the drive circuit comprises:
   a first plurality of transistors of a first path of the multiphase motor;
   a second plurality of transistors of a second path of the multiphase motor; and
   a controller configured to:
   detect that a DC-link voltage of the drive circuit is less than a first voltage and greater than a second voltage, wherein the second voltage is less than the first voltage,
   operate the drive circuit in a second drive mode in response to detecting that the DC-link voltage of the drive circuit is less than the second voltage, wherein the second drive mode comprises a drive mode in which all transistors of the first path and all transistors of a second path of the multiphase motor are opened,
   detect that the DC-link voltage of the drive circuit rises above the second voltage and less than the first voltage, and
   alternate operating the drive circuit between the first drive mode and the second drive mode until the DC-link voltage of the drive circuit rises above the first voltage.

10. The drive circuit as claimed in claim 9, wherein the controller is configured to:
    detect that the DC-link voltage of the drive circuit is greater than a third voltage, wherein the third voltage is an overvoltage greater than the first voltage, and
    operate the drive circuit in the first drive mode in response to detecting that the DC-link voltage of the drive circuit is greater than the third voltage.

11. The drive circuit as claimed in claim 10, wherein the controller is configured to:
    detect that the DC-link voltage of the drive circuit is less than the third voltage and greater than the first voltage; and
    operate the drive circuit in a normal mode in response to detecting that the DC-link voltage of the drive circuit is less than the third voltage and greater than the first voltage.

12. The drive circuit as claimed in claim 11, wherein the first voltage is 6.2v, the second voltage is 5.8v, and the third voltage is 38v.

13. The drive circuit as claimed in claim 9, wherein the first path of the multiphase motor is a low-side path.

14. The drive circuit as claimed in claim 13, wherein the second path of the multiphase motor is a high-side path.

15. The drive circuit as claimed in claim 14, wherein the transistors of the first path and the transistors of the second path comprise field effect transistors (FETs).

16. The drive circuit as claimed in claim 15, wherein the transistors of the first path comprise three FETs and the transistors of the second path comprise three FETs.

17. The drive circuit as claimed in claim 16, wherein the controller comprises an electric energy supply (EES).

\* \* \* \* \*